Patented Mar. 8, 1932

1,848,386

UNITED STATES PATENT OFFICE

ARLIE W. SCHORGER, OF MADISON, WISCONSIN, ASSIGNOR TO C. F. BURGESS LABORATORIES, INC., OF MADISON, WISCONSIN, A CORPORATION OF DELAWARE

POROUS STRUCTURE SUCH AS SOUND ABSORBENT PLASTER

No Drawing.    Application filed April 6, 1928. Serial No. 268,081.

The present invention relates generally to porous structures such as sound absorbent plasters for walls, ceilings and the like, to which is has particular reference.

At the present time sound absorbent plasters consist of aggregates theoretically bound only at the points of contact of the aggregates by a binder, such as plaster of Paris. The aggregates usually consist of a screened material such as 12 to 20 mesh sand, slag, or the like. The porosity is obtained by mixing a limited amount of binder so that the interstices between the particles of aggregate are not filled completely. What is desired are continuous air passages extending from the surface to the interior, a desirable condition for absorbing sound. Ordinarily this condition is obtained imperfectly since during wet mixing much of the air is forced out of the mass of aggregates by the water, and the dilute suspension of binder, such as plaster of Paris, settles rapidly to form pockets of air rather than continuous passages.

A characteristic feature of such plasters is the limitation of binding agent to such a small quantity in proportion to aggregate that an insufficient amount is present to fill voids between particles of aggregate. The quantity is just sufficient to effect cementation of aggregate particles at the points of contact, considering, however, that a certain proportion of it naturally distributes itself about the particles as a coating.

I have observed that when a material is added to the mix which is effective to lower the surface tension of the water, a better product is obtained, more of the bonding agent being drawn to the contacting points between the aggregates, giving a stronger product and a more porous product. Because of the lowered surface tension, the water is more responsive to capillarity, thus bringing greater amount of bonding material into the contacting areas.

One object of the present invention, therefore, is to lower the surface tension of the water employed in mixing the plaster.

Another object is to incorporate into the prepared base, prior to addition of water, a material which will lower the surface tension.

Still another object is to add an agent which is effective in extremely low concentrations, such for example, as a frothing or flotation agent used in ore concentration.

The present invention is based largely upon the discovery that mineral flotation or frothing agents are effective for the desired purpose. Such an agent may be added directly to the compounded ingredients prepared for addition of water. On addition of water the agent becomes effective, as for example, by dissolving to lower the surface tension. A film of solution can be readily formed and air is trapped by such films. Particles of the binding agent collect in the film, and as the water is removed by soaking into the aggregate or by evaporation, the films gradually burst leaving voids and depositing binder at the points of contact between particles of the aggregate, and as thin films on the aggregate.

Because of the lower surface tension greater quantities of binding material are deposited at points of contact which strengthen the mass when setting has occurred. The liquid more readily holds the binding agent so that less settling takes place. The net result is the formation of more continuous air passages.

The aggregate may be sand or slag or any other suitable material. Slag, and especially granulated slag is preferable because of its lower weight. The most satisfactory size is from 12 to 20 mesh. Coarser particles do not give a sufficiently plastic mixture while finer particles give a less porous product and one that does not set as hard.

The binder may be Portland cement or various gypsum plasters. Plaster of Paris in ordinary forms sets too rapidly for desirable use, so that a retarding agent is employed. I prefer to use a retarding agent which is not effective to increase viscosity, as this result appears to prevent the maintenance of air bubbles. Organic or inorganic retarding agents may be used, such, for example, as microcosmic salt or calcium acetate.

A large variety of mineral flotation agents are available. My experiments have indicated the advisability of floating calcium sulphate (gypsum or plaster of Paris) with an agent such as a salt containing sulphur, as for example, sodium or other benzenesulphonate. The following agents have been found satisfactory:

Sodium p-toluenesulphonate,
Sodium benzoate,
Sodium sulphanilate,
Sodium zanthate,
Calcium and barium sulphides.

} Flotation agents

In using such agents I have found them to be effective in very low concentrations, usually less than one per cent. With sodium benzenesulphonate I have found that a dry mix containing 0.20% to 0.25% is sufficient.

The following mixture has given an excellent sound absorbent plaster:

|  | Parts by weight |
|---|---|
| Slag (12–20 mesh) | 300 |
| Plaster of Paris | 125 |
| Microscosmic salt or calcium acetate | 2 or 3 respectively |
| Sodium benzenesulphonate | 1 |
| Water | 85 |

The above formula is given only by way of example to illustrate a practical application of the invention. It is to be considered as such and not as a limitation of the invention to the ingredients and proportions disclosed. The invention broadly is to be considered larger in scope and to be extended in the directions generally indicated by the foregoing as comprehended by the scope of the appended claims.

What I claim is:

1. A sound absorbent plaster for walls, ceilings, and the like containing plaster of Paris, sodium benzenesulphonate, and an aggregate, the plaster of Paris being insufficient to fill the voids of the aggregate.

2. A sound absorbent plaster for walls, ceilings, and the like containing essentially a slag aggregate, a binder of plaster of Paris, microcosmic salt, sodium benzenesulphonate, and water.

3. A sound absorbent plaster for walls, ceilings, and the like containing essentially 300 parts of 12 to 20 mesh slag, 125 parts plaster of Paris, 2 parts microcosmic salt, 1 part sodium benzenesulphonate and 85 parts water.

4. The method of compounding a sound absorbent plaster containing essentially an aggregate and a limited amount of plaster of Paris, which comprises incorporating a small proportion of sodium benzenesulphonate with said plaster.

5. The method of compounding a sound absorbent plaster containing essentially an aggregate and a limited amount of plaster of Paris, which comprises incorporating from .20 to .25 percent of sodium benzenesulphonate with said plaster, based on the dry ingredients of said plaster.

In testimony whereof I have subscribed my name.

ARLIE W. SCHORGER.